United States Patent
Muser

[19]

[11] Patent Number: 5,921,145
[45] Date of Patent: Jul. 13, 1999

[54] MOUNTING STRUCTURE FOR CYCLE HANDLEBAR

[75] Inventor: Paul Muser, Oakville, Canada

[73] Assignee: Supima Holdings Inc., Oakville, Canada

[21] Appl. No.: 08/811,686

[22] Filed: Mar. 5, 1997

Related U.S. Application Data

[51] Int. Cl.⁶ ................................................. B62K 21/14
[52] U.S. Cl. ........................................... 74/551.2; 280/276
[58] Field of Search ................... 74/574, 551.2; 188/130; 280/275, 276, 283

[56] References Cited

U.S. PATENT DOCUMENTS

| | | |
|---|---|---|
| 2,303,568 | 12/1942 | McWhorter . |
| 2,341,821 | 2/1944 | Schwinn ............................ 74/551.2 X |
| 2,349,762 | 5/1944 | Schwinn ............................ 74/551.2 |
| 2,396,041 | 3/1946 | Du Pont ............................ 74/551.2 |
| 3,058,321 | 10/1962 | Aske ................................. 74/574 X |
| 3,545,737 | 12/1970 | Lamprey et al. . |
| 3,675,787 | 7/1972 | Krauskopf . |
| 4,464,146 | 8/1984 | Arthur . |
| 4,833,938 | 5/1989 | Reinwall et al. ................... 74/574 |
| 4,939,950 | 7/1990 | Girvin ............................... 74/551.2 |
| 5,138,900 | 8/1992 | Hals . |
| 5,181,436 | 1/1993 | Lai . |
| 5,241,881 | 9/1993 | Chen . |
| 5,269,552 | 12/1993 | Yelverton ............................ 280/283 |
| 5,285,697 | 2/1994 | Clausen . |
| 5,427,208 | 6/1995 | Motobu et al. . |
| 5,660,406 | 8/1997 | Menze ............................. 74/551.2 X |
| 5,775,710 | 7/1998 | Yu ..................................... 280/283 |

FOREIGN PATENT DOCUMENTS

| | | |
|---|---|---|
| 0 703 138 | 3/1996 | European Pat. Off. . |
| 1078644 | 11/1954 | France ............................. 74/551.2 |
| 2 730 022 | 8/1996 | France . |
| 813949 | 9/1951 | Germany ........................... 280/275 |
| 3535859 | 4/1987 | Germany ........................... 74/574 |
| 419 336 | 11/1934 | United Kingdom . |
| 437984 | 11/1935 | United Kingdom ............... 74/551.2 |
| 531 716 | 1/1941 | United Kingdom . |
| 531716 | 1/1941 | United Kingdom ............... 74/551.2 |
| 591 126 | 8/1947 | United Kingdom . |
| 591126 | 8/1947 | United Kingdom ............... 74/551.2 |
| 847549 | 9/1960 | United Kingdom ............... 74/574 |

*Primary Examiner*—John A. Jeffery
*Assistant Examiner*—Mary Ann Battista

[57] ABSTRACT

A mounting structure for a cycle handlebar comprises a stem which is cantilevered to a steer tube connector and is rotatably coupled for relative movement to the steer tube connector with the axis of rotation disposed above the steer tube connector and laterally spaced from the steer tube connector so that the handlebar may be selectively positioned relative to the steer tube connector and the cycle in a multiplicity of desired locations. A resilient damper is disposed between components in the coupling which have a toothed surface to mold the damper into an intermediate gear coupling the components to one another.

1 Claim, 3 Drawing Sheets

MOUNTING STRUCTURE FOR CYCLE HANDLEBAR

FIELD OF THE INVENTION

This invention relates to a mounting structure for connecting a handlebar of a cycle to a cycle frame.

BACKGROUND OF THE INVENTION

Whenever a cyclist rides over an obstacle or on rough terrain, shock is transmitted from the wheels through the cycle frame to the rider at the feet, the hands, and the seat, wherever the rider and the frame are in contact.

In order to protect themselves from injury, riders will naturally raise themselves from the seat whenever an obstacle is encountered, particularly where there is a significant drop in elevation, such as a sidewalk or curbstone. Inevitably, this causes greater strain on the rider's wrists since more of the shock must be absorbed at the handlebars. Where the obstacle or drop is unforeseen, the rider has no opportunity to take preventive action and injuries will often occur.

An object of this invention is to provide better shock absorption at the handlebars to minimize injury and to improve the comfort of the rider by providing means to adjust the position of the handlebars.

SUMMARY OF THE INVENTION

The invention provides a mounting structure for coupling a handlebar for a cycle to a steer tube connector, the mounting structure comprising a stem rotatably coupled at an inner end to a shaft supported in a bracket adapted for connection to the steer tube connector and the stem at the other end being adapted to receive the handlebar, the shaft axis being upwardly spaced from a free upper end of the steer tube connector on an axis which is laterally spaced from the steer tube connector.

In accordance with another aspect of the invention, there is provided a shock absorber in the form of a cylinder made of resilient material which is placed between components that are rotatably coupled to one another at a coupling, a first component being cantilevered to a second component on said coupling, a toothed surface on at least one of said components being adapted to mold the damper in situ and to deform the damper. Alternatively, the damper may be pre-molded with a geared surface adapted to mesh with the associated components.

BRIEF DESCRIPTION OF THE DRAWINGS

A preferred embodiment of the invention is described in detail below with reference to the accompanying drawings, in which.

DETAILED DESCRIPTION OF THE PREFERRED EMBODIMENT

Figure 1:
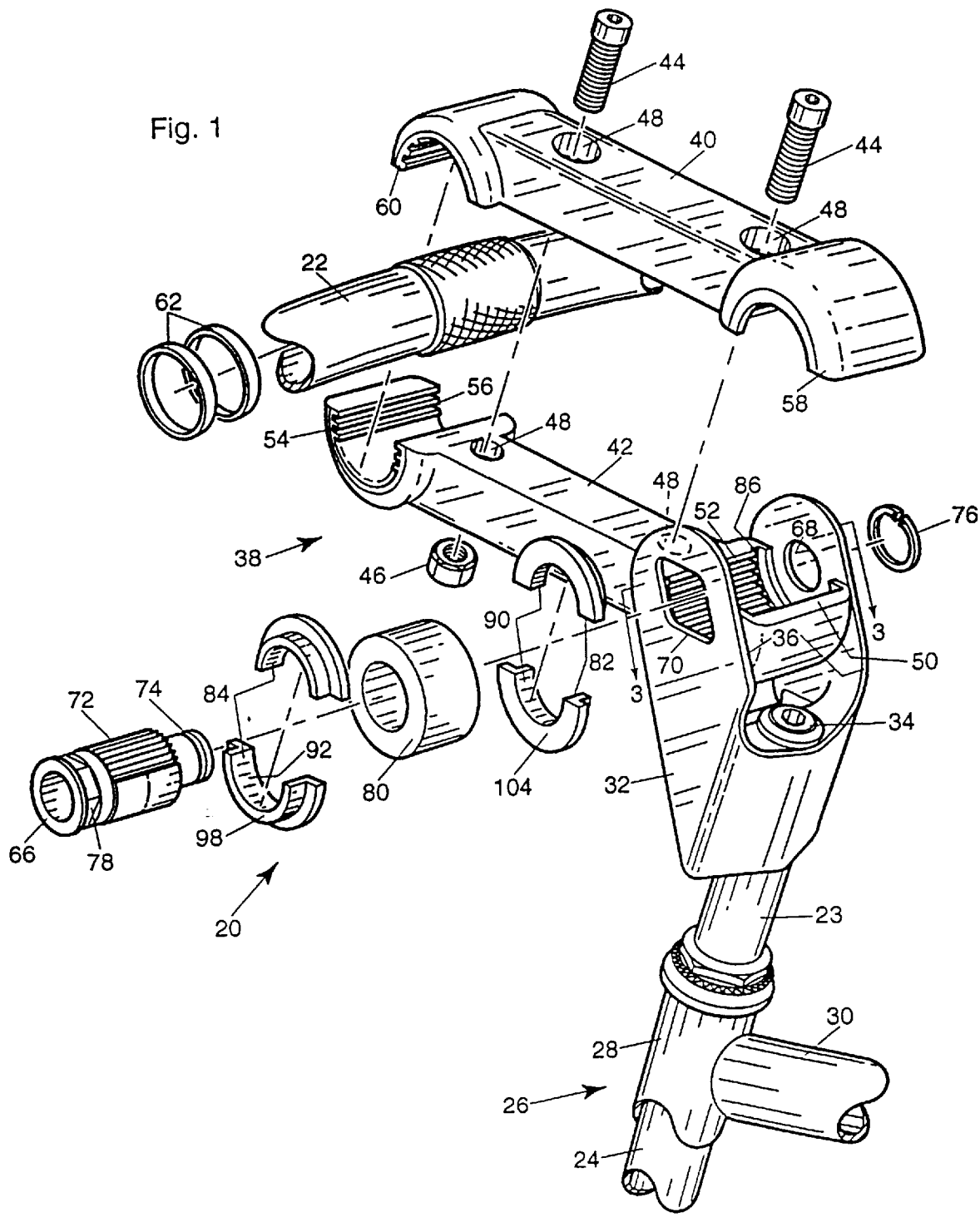
FIG. 1 is a perspective exploded view showing the invention.

The mounting assembly is generally indicated in FIG. 1 by numeral 20 and is associated at one end with a handlebar 22 and at the other end with a steer tube connector 23 which is drawn in the embodiment of FIG. 1 so as to be axially received in a steer tube 24. The steer tube 24 is received within an upwardly extending hollow shaft or tube 28 forming part of the cycle frame 26. A portion of a horizontally extending crossbar 30 forming part of the cycle frame is also shown in FIG. 1.

The mounting assembly 20 includes a bifurcated bracket 32 which is mounted to the steer tube connector 23 with a conventional steer tube connecting bolt 34 received through an aperture provided in the bracket. A pair of spaced parallel arms 36 forming part of the bracket 32 extend upwardly on opposite sides of the steer tube connector 23 and, together with the steer tube connector, subtend an obtuse angle so that, in the configuration drawn in FIG. 1, the arms are directed forwardly toward the handlebar 22. As will be described in more detail with reference to FIG. 2, the steer tube connector 23 may be rotated inside the steer tube 24 by 180° to bring the handlebars behind the steer tube 24 and therefore closer to the rider, in which case the arms 36 are directed rearwardly.

A stem 38 is provided in two parts, comprising an upper portion 40 and a lower portion 42, which mate on a horizontal parting surface (as drawn) and are held together by a pair of bolts 44 and cooperating nuts 46 (of which only one is drawn in FIG. 1). Through holes 48 are provided in the stem 38 to receive the bolts 44.

An inner end 50 of the lower portion 42 is in the form of a half cylinder having an axis which is transverse to the arms 36 and the inside surface of the cylinder has spaced parallel teeth 52 which extend longitudinally in parallel to the cylinder axis and define a geared surface. A similar half cylinder defines an outer end 54 for the lower portion 42 and likewise carries spaced parallel teeth 56 which extend longitudinally in parallel to the cylinder axis. The profile of the teeth is drawn as square but many other configurations of teeth may be used, as will become apparent from the description which follows.

The upper portion 40 (as drawn in FIG. 1) of the stem 38 similarly comprises half cylinder portions with toothed inner surfaces at an inner end 58 spaced from an outer end 60. The handlebar 22 is received in a socket defined between the outer ends 54, 60 of the lower and upper portions 42, 40, respectively. Gasket rings 62 may be threaded over the handlebar 22 at the interface between the handlebar and the stem 38.

The length of the stem 38 will be selected in accordance with the adjustability to the frame which is desired. As will be seen from FIG. 2, the handlebar 22 is spaced from the steer tube connector 23 by a considerable distance, typically 7 in. (18 cm.), which allows the rider to extend his reach forward so that the bicycle may be used in a forward crouching position, but which also allows the rider to sit more upright with the handlebar closer to the rider's body as indicated in the ghost outline position drawn to the right of FIG. 2, resulting from a 180° rotation of the steer tube connector 23 indicated by arrow 64.

The inner end of the stem 38 is disposed between the arms 36 and is rotatably coupled to a cylindrical shaft 66 dimensioned to bridge the separation between the arms 36 and supported on the arms in oppositely disposed apertures 68, 70 formed at the free end of the arms. One aperture 68 is round whereas the other aperture 70 is square. The axis of the shaft 66 is upwardly spaced from the free upper end of the steer tube connector 23 and is laterally spaced from the axis of the steer tube connector so as to lie between the steer tube connector 23 and the handlebar 22, in the configuration shown in FIG. 1.

The shaft 66 has a toothed or geared surface 72 between its ends and has a circumferential groove 74 at one end which, in use, receives a circlip™ 76 that locates against the arm 36 which carries the round aperture 68. The other end of the shaft 66 has a number of flats 78 for location inside the square aperture 70 and to prevent relative motion between the shaft and the bracket 32.

A shock absorbing damper 80 in the form of a right circular cylinder and made from a high-friction resilient material such as polyurethane is disposed on the shaft 66 and occupies the space between the geared surface 72 of the shaft 66 and the inner ends 50, 58 of the stem 38.

Figure 2:
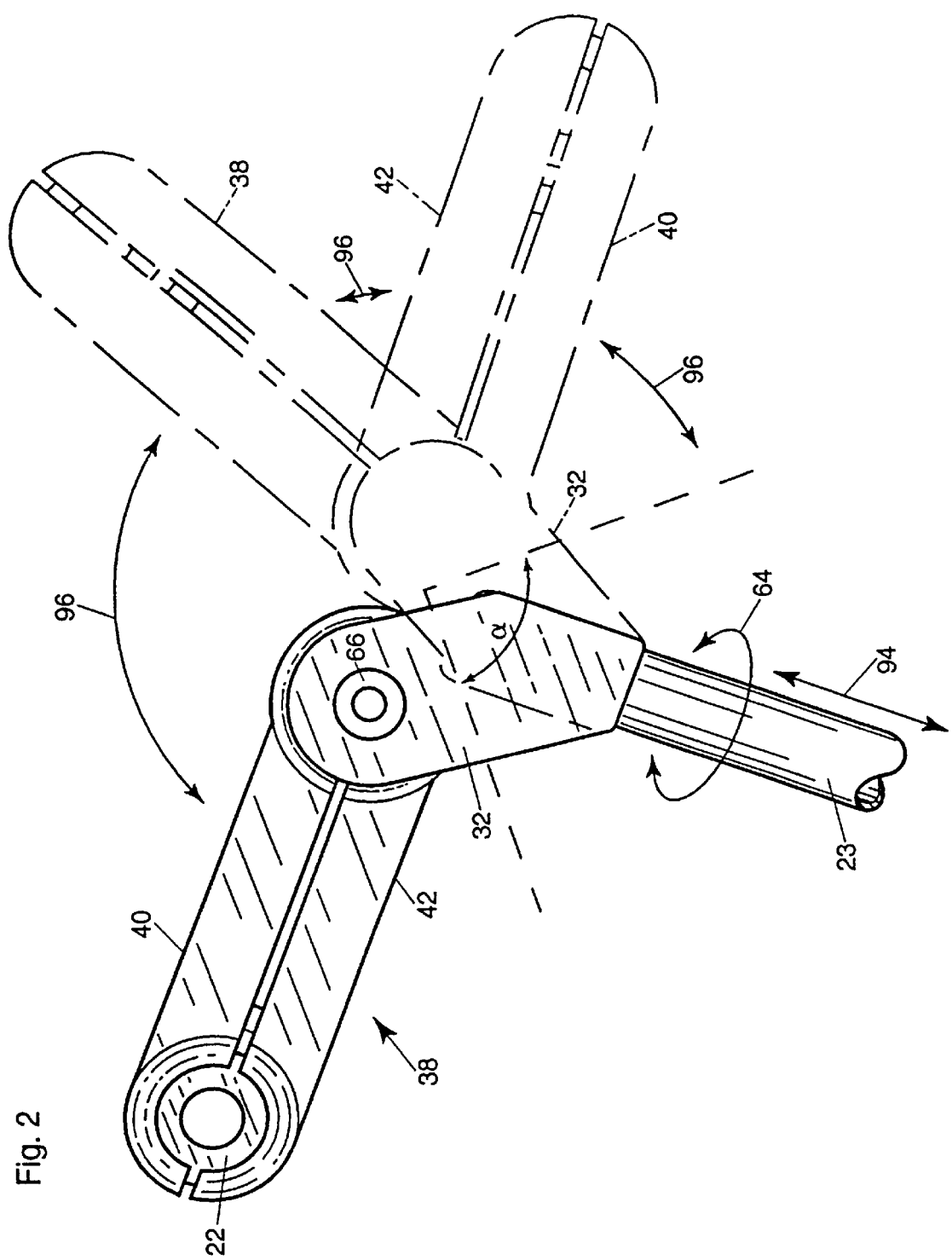
FIG. 2 is a schematic side elevation of the invention.

The stem 38 may be angularly disposed on the shaft 66 at various radial positions as indicated in the ghost outline positions drawn in FIG. 2. Such changes in position brought about by repositioning the stem 38 on the shaft 66 will be static and will be selected by the rider according to personal preferences.

It will be appreciated that such rotation of the stem 38 on the shaft 66 brings about a commensurate change in the height of the handlebar 22 above the crossbar 30 and the effective separation between the handlebar 22 and the steer tube connector 23. Such changes in height may be compensated by moving the steer tube connector 23 axially as indicated by arrow 94 into or out of the steer tube 24 (FIG. 1), as the case may be.

By rotating the stem 38 on the shaft 66 as indicated by arrows 96 and by moving the shaft or the center of rotation forward (as drawn) or backward (as shown in ghost outline) through rotation of the steer tube connector 23 by 180° inside the steer tube 24 (as indicated by arrow 64), the handlebar 22 may be moved to almost any position required to suit individual preferences.

It will be appreciated that the stem 38 has a wide range of motion almost unhindered by the steer tube connector 23 because the shaft 66 is sufficiently spaced therefrom both upwardly and laterally to allow the upper and lower portions 40, 42 to clear the free end of the steer tube connector. The operating range of the stem 38 exceeds 180°, both where the center of rotation is forward and backward so that the full range of motion is limited only by the length of the arms 32 and the angular disposition of the arms 32 relative to the steer tube connector. In addition, there are no encumbrances in the operating range between the stem 38 and the steer tube connector 23 to limit motion, the shock absorber being disposed on the center of rotation in the form of the damper 80.

In the embodiment drawn, the resulting effective range of motion is about 270°, the excluded range of operation being indicated in FIG. 2 by the angle α. This feature of the invention will also allow a cycle to be adjusted to accommodate riders having a different arm reach so that the bicycle can "grow" with a child and be used by different family members.

Smaller changes in the radial position of the stem extension 38 will be brought about in dynamic fashion whenever the rider applies a load to the handlebar 22 which is effectively cantilevered to the bracket 32 by the stem 38.

In use, the upper and lower portions 40, 42 of the stem 38 are clamped very tightly at the bolts 44 and the material comprising the damper 80 is squeezed into the spaces between the teeth 52 of the stem 38 and the geared surface 72 of the shaft 66. The damper 80 is effectively molded in situ to conform to the adjacent toothed surfaces and defines an intermediate gear between the shaft 66 and the stem 38.

To contain and locate the damper 80 between the arms 36 and to prevent the material comprising the damper from extruding into the apertures 68, 70, a transverse barrier is disposed inside the inner ends 50, 58 in the form of a pair of split rings 82, 84 disposed at opposite ends of the shaft 66. The rings 82, 84 are located in cooperating circumferential grooves 86, 88 (FIG. 3) formed on the inner surface of the cylindrical portions forming the inner end of the stem 38, the grooves 86, 88 having the same depth as the teeth 52. It will be appreciated that the inner ends 50, 58 are formed with transverse end walls adjacent the grooves 86, 88 to thereby contain the rings 82, 84.

To simplify manufacture, the geared surfaces at the inner ends 50, 58 of the stem 38 may be provided on inserts which are made separately and assembled into the cylinders, for example, by means of a key and slot coupling.

Figure 3:
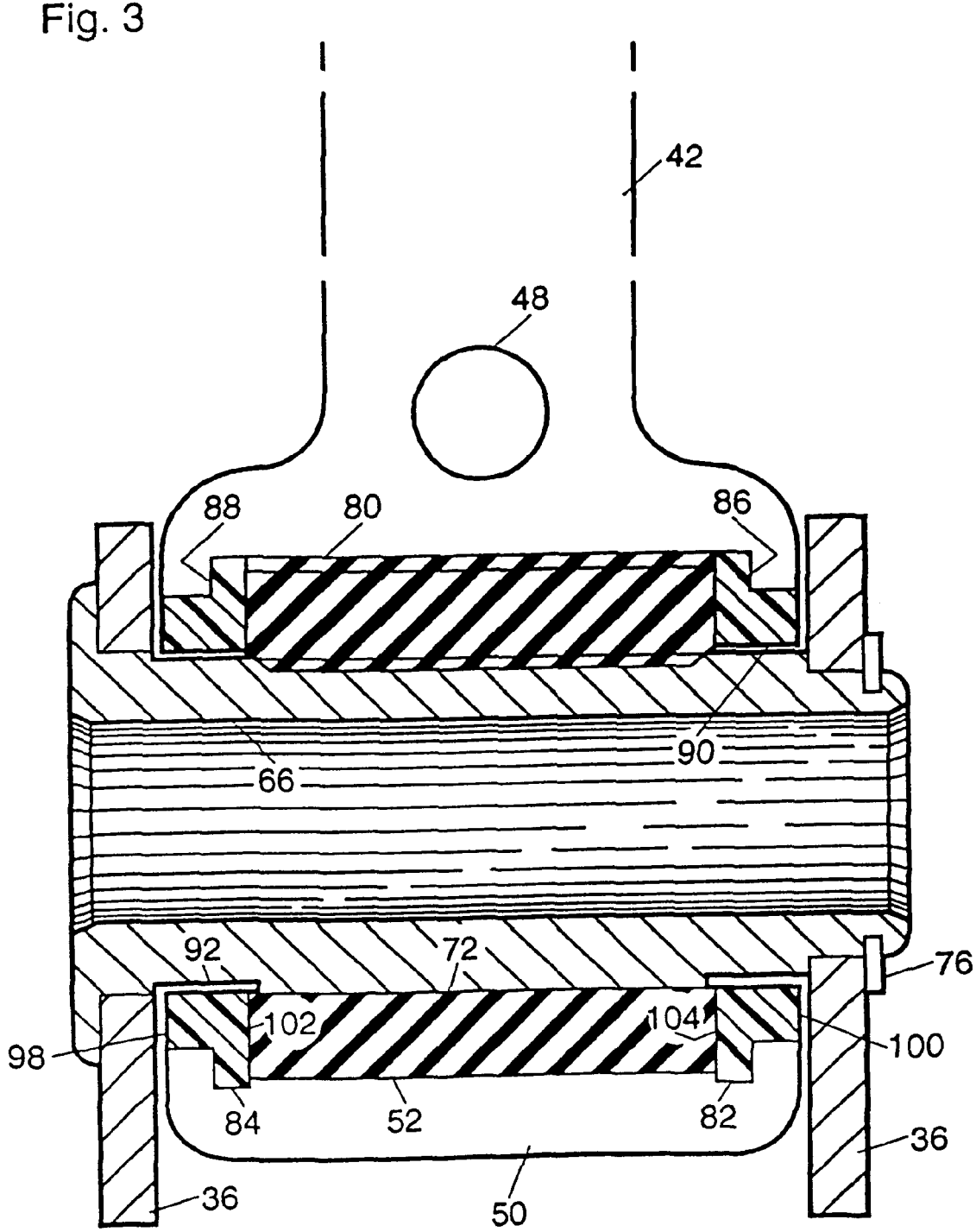
FIG. 3 is a partly sectioned view (drawn to a larger scale) on line 3—3 of FIG. 1.

Conveniently, the rings 82, 84 have an L-shaped cross-section having six sides, all of which define bearing surfaces including cylindrical bearing surfaces 90, 92 which can rotate freely on the shaft 66 a small clearance space being provided between the rings 82, 84 and the shaft 66 which is exaggerated in the drawing of FIG. 3 for purposes of illustration. Outer bearing surfaces 98, 100 make sliding contact with the arms 36 of the bracket 32 to minimize friction therebetween and inner bearing surfaces 102, 104 adjacent the damper 80 allow the stem 38 maximum freedom of rotation. The remaining bearing surfaces similarly allow the inner end of the stem 38 to rotate freely on the shaft 66 should the cylindrical bearing surfaces 90, 92 become inoperative because of dirt and the like.

It will be noted that the thickness of the damper 80 is selected to occupy at least a portion of the space between the teeth 52 and the geared surface 72, and in the embodiment illustrated, exceeds the height of the rings 82, 84 (as can best be seen in FIG. 3). As will be seen in FIG. 3, the material comprising the damper 80 occupies the entire depth of the teeth in the lower portion 42 of the stem and of the teeth in the geared surface 72 of the shaft 66.

Any load which is applied on the handlebar 22 is transmitted to the damper 80 which will flex angularly and will be placed in shear in response to the torque and the damper will return to a neutral position guided by the split rings 82, 84 which operate to maintain alignment between the components. Because of its inherent resiliency, the damper 80 does not require to be pre-stressed prior to the application of a load and the damper will operate in any direction. The damper 80 will therefore respond to cushion any impacts transmitted to the handlebar irrespective of whether the rider is climbing an obstacle or descending the obstacle.

By virtue of its construction, the damper 80 will make intimate contact with the adjacent geared surfaces and be infinitely adjustable so as to be operable in any intermediate relative position between the associated components. In some applications, such a range of adjustability may not be required or desirable and it will be understood that a pre-formed or pre-molded damper made of resilient material having an irregular or meshed surface adapted to cooperate with the geared surfaces of associated components will be a satisfactory alternative to a damper which is molded in situ. Such a pre-molded damper will permit the upper and lower portions 40, 42 to be assembled with less clamping force than with a damper which is molded in situ.

The damper provides exceptional dampening characteristics and obviates the need to modify the cycle frame to incorporate hydraulic or pneumatic devices, torsion bars and springs thereby preserving the integrity of the frame.

It will be understood that the advantages of the invention may be realized by other embodiments of the invention and that the aforementioned description does not limit the construction of the claims. It is also envisaged that the damper, in accordance with the invention, may find application in other structures wherever shock absorption may be required or desirable, without limitation. One such application for coupling a cycle seat to a seat post is described in Applicant's copending application entitled "Mounting Structure for Cycle Seat" and the description of this invention is herein incorporated by reference.

I claim:

1. A shock absorber assembly comprising:

a damper in the form of a cylinder of polyurethane material having a predetermined outer diameter and having a longitudinally extending opening;

a first component defining a longitudinal axis received in said longitudinally extending opening;

a second component rotatably coupled to the first component with said damper disposed between said first and second components, said longitudinal axis defining an axis of rotation for the first and second components, said second component including first and second portions separable from each other to receive the damper therebetween;

a pair of bearings transversely disposed to said longitudinal axis and bearing on opposite ends of said damper, the bearings being adapted to confine the damper, and to prevent axial displacement and flow of the damper; and clamping means coupling said first portion to said second portion and adapted to urge said second component into engagement with an outer cylindrical surface of said damper so that the damper makes intimate contact with said first and second components, and with said bearings.

* * * * *